O. BAHLS.
STRUCTURE PARTICULARLY FOR INSPECTING AUTOMOBILES.
APPLICATION FILED OCT. 17, 1919.
1,357,022.
Patented Oct. 26, 1920.
Fig:1.
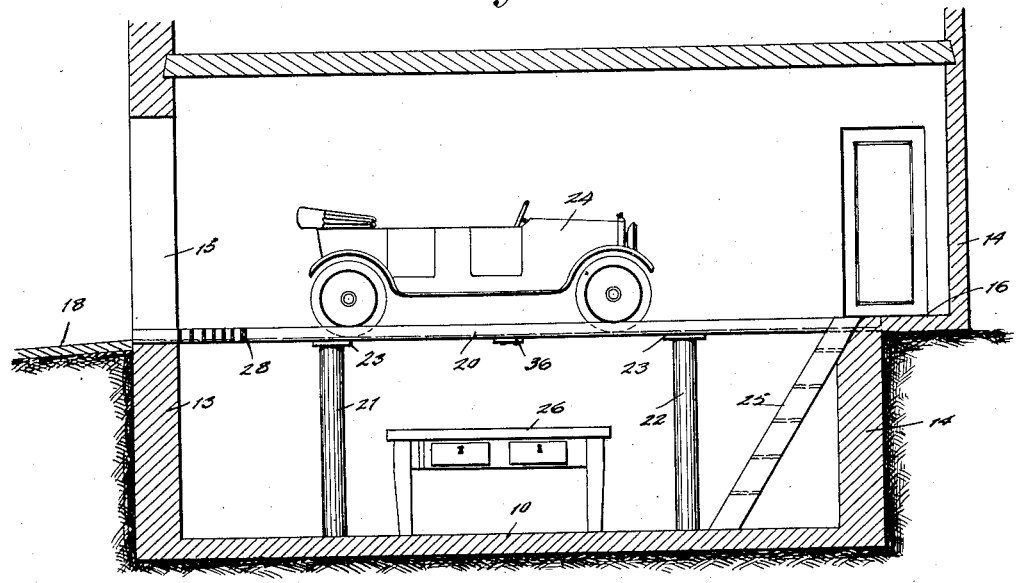
Fig:2.
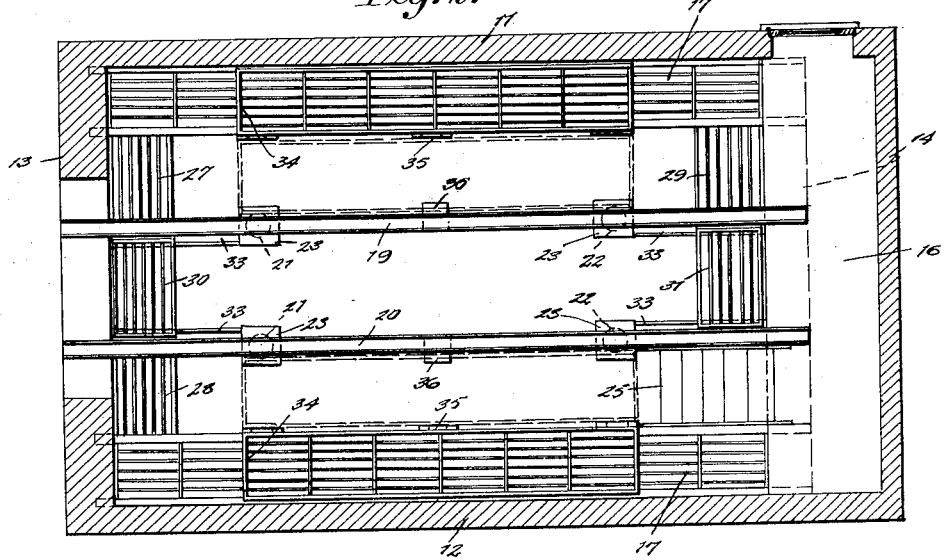
INVENTOR
Otto Bahls
BY G. P. Goepel
ATTORNEY

UNITED STATES PATENT OFFICE.

OTTO BAHLS, OF ASTORIA, NEW YORK.

STRUCTURE PARTICULARLY FOR INSPECTING AUTOMOBILES.

1,357,022.  Specification of Letters Patent.  Patented Oct. 26, 1920.

Application filed October 17, 1919. Serial No. 331,345.

*To all whom it may concern:*

Be it known that I, OTTO BAHLS, a citizen of the United States, and a resident of Astoria, in the borough of Queens, county of Queens, city and State of New York, have invented certain new and useful Improvements in Structures Particularly for Inspecting Automobiles, of which the following is a specification.

The present invention relates to structures particularly for inspecting automobiles, and has for an object to provide such a structure which will enable an automobile to be thoroughly examined from beneath and at its sides without necessitating the man making the inspection lying on a floor or assuming other inconvenient positions, but on the other hand, enabling him to thoroughly examine, and work on if necessary, all parts of the automobile, in a standing posture.

Heretofore, it was usual when inspecting the under side of an automobile to lie upon the floor, and in some cases pits were used above which the automobile was placed, which however, did not give such ample room or expose the under side of the automobile so completely as to enable a proper inspection, and these pits were furthermore objectionable and dangerous because gas and other fumes would collect therein and their use was therefore prohibited by the fire underwriters. I propose in the present invention to provide a structure which will be free from such dangers and so arranged as to enable a thorough inspection and provide ample room at all sides of the automobile.

With these and other objects in view, an embodiment of my invention is shown in the accompanying drawings, and this embodiment will be hereinafter more fully described with reference thereto, and the invention will be finally pointed out in the claim.

In the accompanying drawings,

Figure 1 is a vertical longitudinal sectional view of an inspection structure according to the present embodiment of my invention; and Fig. 2 is a horizontal sectional view thereof.

Similar reference characters indicate corresponding parts throughout the several figures of the drawings.

Referring to the drawings, the inspection structure comprises a floor 10, side walls 11 and 12, and front and rear walls 13 and 14, the front wall being provided in its upper portion with a doorway or entrance opening 15 substantially elevated from the floor. The rear wall is set back at its upper portion to provide an elevated floor 16, grating walks 17 extending from the said elevated floor along the side walks 11 and 12, the said walks being substantially level with the lower side of the entrance 15 which in turn is substantially level with the approach 18 to the structure.

A pair of spaced channel tracks 19 and 20 extend longitudinally of the structure in spaced relation to each other and spaced from the walks 17 and are supported at their ends by the front wall 13 and the rear wall 14, while intermediately their ends they are supported by posts 21, 22, provided at their upper ends with head plates 23 projecting outwardly from the said tracks. The said channel tracks are level with the approach 18 so that an automobile 24 may be directly run thereon as shown in Fig. 1.

Stairs 25 extending downwardly from the elevated floor 16 permit descent to the floor 10 and at a suitably convenient location there is provided a work bench 26 to contain necessary tools.

Grating walks 27 and 28 are provided along the front wall 13 extending from the walks 17 to the outer sides of the tracks, and permitting a person to walk from the entrance to the walks 17, while along the rear wall 14 there is provided a walk 29 extending from one of the walks 17 to the outer side of the track 19. Between the tracks there are provided at each end, grating platforms 30 and 31 slidably mounted in channel supports 33 mounted upon the inner sides of the tracks, and which may be moved toward or away from the automobile to permit a man to work upon the front or the rear of the automobile supported upon the tracks. Auxiliary grating walks 34 are hingedly mounted upon the walks 17 as at 35 and may be swung across the space between the walks 17 and the tracks to fill in the said space, the head plates 23 of the posts 21 affording supports for the said auxiliary walks at their ends while intermediate supports 36 are secured to the tracks to support the same centrally.

When the auxiliary walks are thrown back, and the platforms 30 and 31 moved away from the front and rear of the automobile, an open space is provided entirely about the same to permit a man to inspect it at all sides, and by providing a ladder or an adjustable platform upon the floor 10 he may elevate himself so as to work in a standing posture at any portion of the sides or front and rear of the automobile while sufficient head room is provided beneath the automobile to permit of a thorough inspection from beneath. By swinging the auxiliary walks 34 into the dotted line position, Fig. 2, and moving the platforms 30 and 31 in the rear and in front of the same, a street level platform is provided entirely about the automobile. It will be understood that suitable illuminating means may be provided for lighting the structure where desired.

With my improved structure, the automobile may be thoroughly examined with facility and in a relatively short space of time, while the structure is such that it may be maintained in a thoroughly clean condition and gas or fumes cannot collect therein.

I have illustrated and described a preferred and satisfactory embodiment of my invention but it is obvious that changes may be made therein within the spirit and scope thereof as defined in the appended claim.

I claim:

A structure of the character described, comprising an inclosure provided with a floor, an upright wall provided with an entrance opening elevated from said floor and having its lower side substantially level with the approach to said inclosure, a pair of tracks within said inclosure extending from said entrance above said floor and adapted to support a vehicle, said tracks being spaced from the side walls of said inclosure, a platform extending along said side walls in spaced relation to said tracks, and removable platform means adapted to bridge the space intervening between said platform and said tracks.

In testimony that I claim the foregoing as my invention, I have signed my name hereunder.

OTTO BAHLS.